May 19, 1964  W. A. HUNTER  3,133,564
ANTI-SPIT-BACK FILL PIPE
Filed Nov. 10, 1960  3 Sheets-Sheet 3
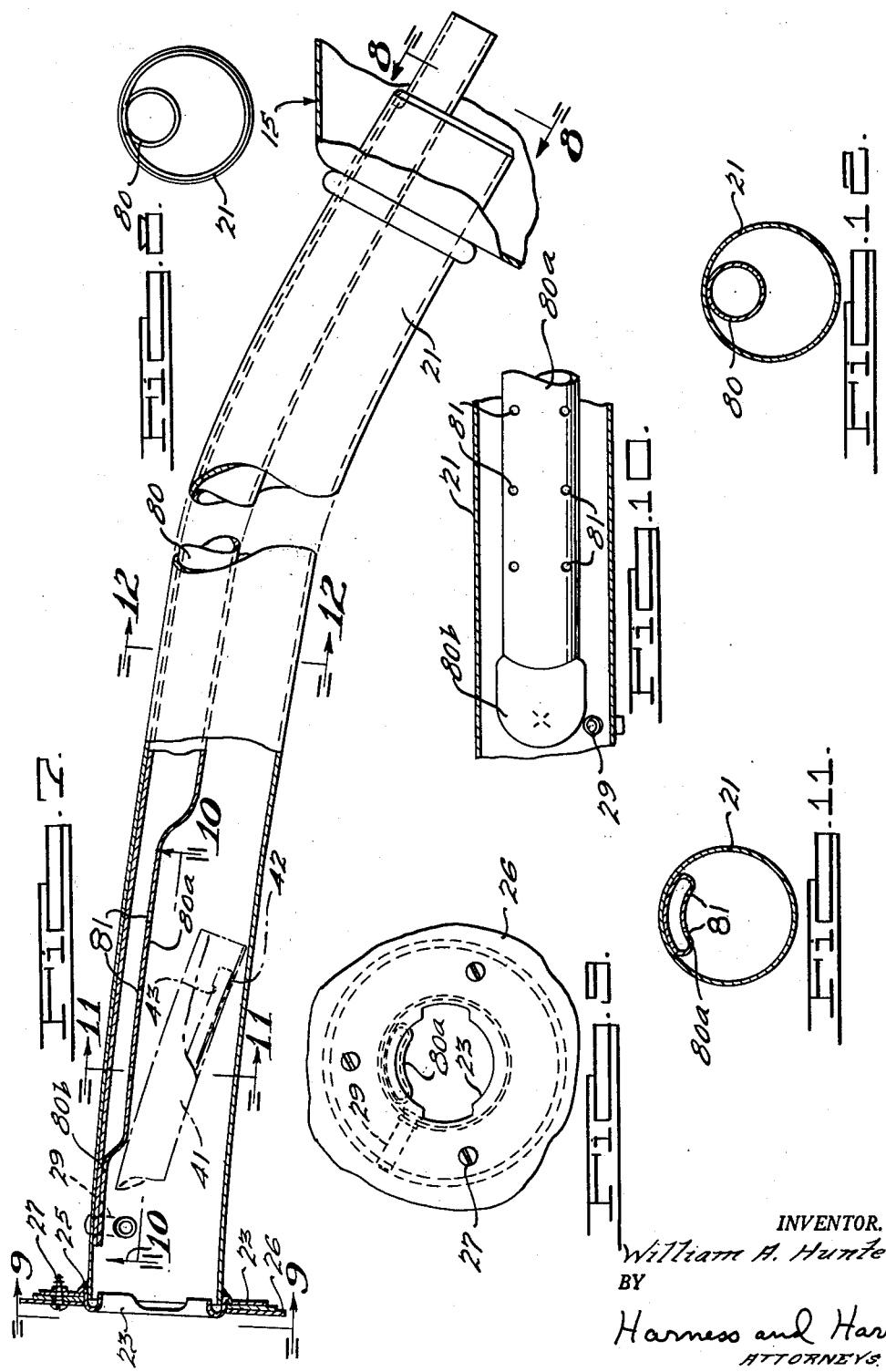
INVENTOR.
William A. Hunter.
BY
Harness and Harris
ATTORNEYS.

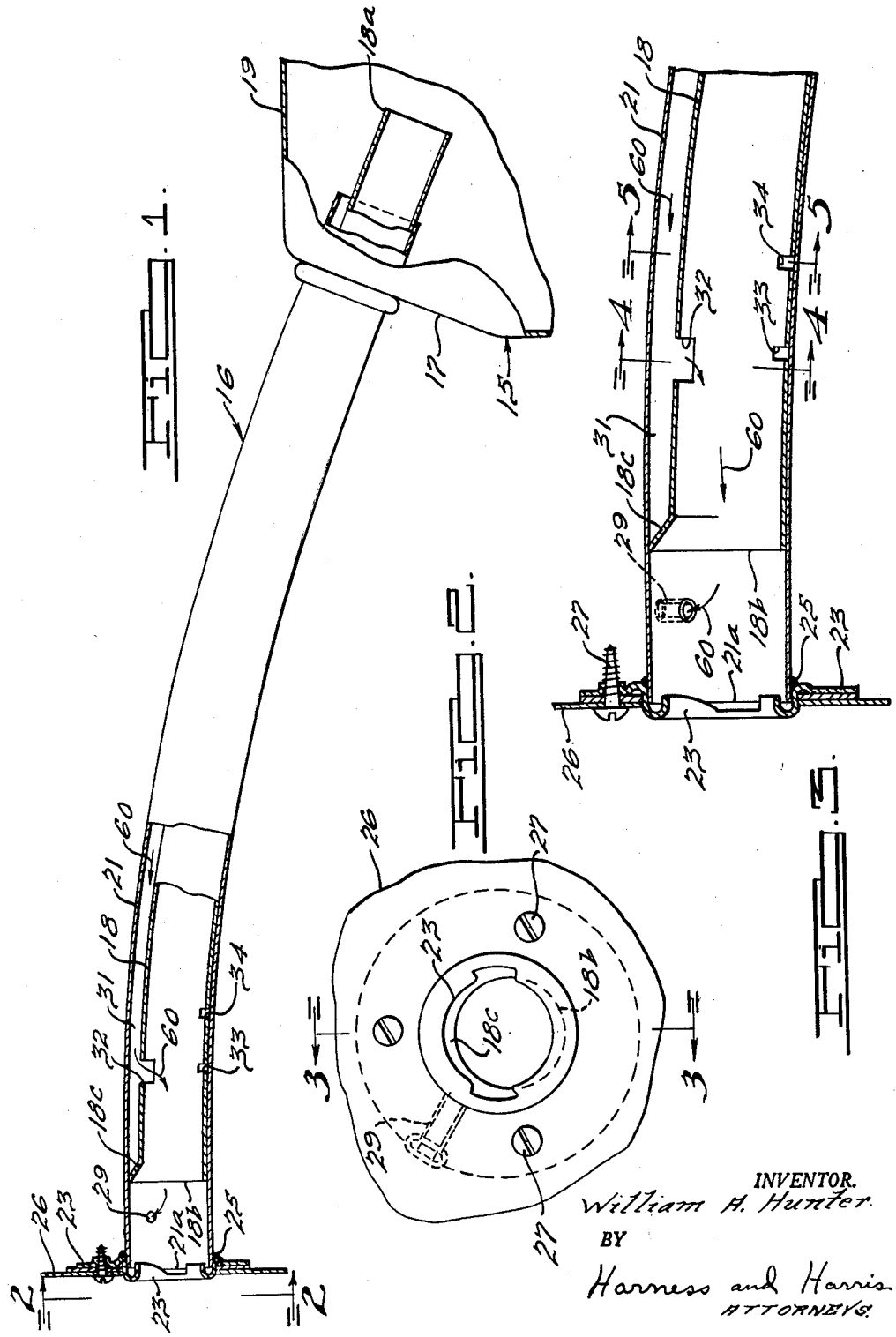

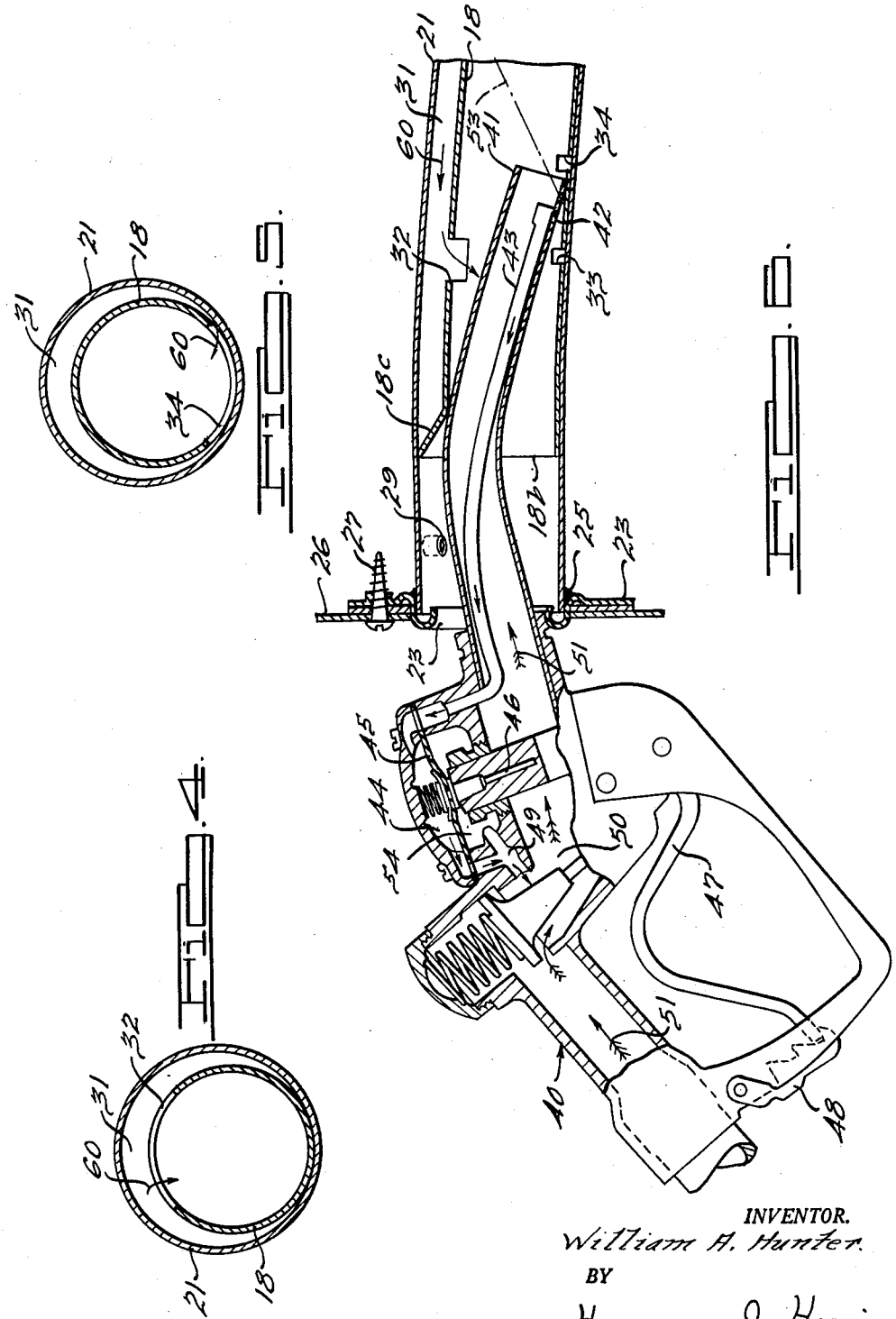

United States Patent Office 3,133,564
Patented May 19, 1964

3,133,564
ANTI-SPIT-BACK FILL PIPE
William A. Hunter, Highland Park, Mich., assignor to Chrysler Corporation, Highland, Mich., a corporation of Delaware
Filed Nov. 10, 1960, Ser. No. 68,395
6 Claims. (Cl. 141—286)

This invention relates to vented tanks and their fill pipes and particularly to the fill pipes for gasoline fuel tanks for motor vehicles that prevent spit-back.

At the present time with the trend towards low silhouette vehicle body designs there have been problems develop as to where to locate the vehicle fuel tank and the fill pipe therefor. In a number of instances because of the particular body styling and space arrangements, the fill pipe for the fuel tank extends into the top part of the fuel tank at a very shallow angle with respect to the horizontal. This shallow angle arrangement of the tank fill pipe has caused problems as to fuel spit-back and overflow during tank filling operations when the current type of high velocity fuel delivery nozzle is utilized.

Another problem associated with fuel tanks for motor vehicles is the inadequate provision for thermal expansion of the fuel that can cause overflow or spillage and thereby provide an explosion or fire hazard in addition to untidiness and obnoxious vapors and the like.

It is a primary object of this invention to provide a vented fill pipe assembly that will eliminate spit-back and/or overflow during a high velocity filling operation and yet permit free venting of the tank and adequate filling thereof before fuel supply cut-off.

It is another object of this invention to provide a fuel tank and a fill pipe assembly therefore arranged in such a manner that provision is made for adequate thermal expansion of the fuel without causing tank overflow or fuel spillage.

It is still another object of this invention to provide an anti-spit-back tank fill pipe arrangement comprising nested fill and vent pipes with port means in the interiorly located vent conduit to direct the vented fluid flow around the suction port of the fill nozzle fluid supply before the fuel can back up in the tank and fill pipe to such a degree that it will be ejected from the open end of the fill pipe as a spit-back.

Other objects and advantages of this invention will become readily apparent from a reading of the following description and a consideration of the related drawings wherein:

FIG. 1 is a fragmentary sectional elevational view of a fuel tank and fill pipe assembly therefor that embodies this invention;

FIG. 2 is an end elevational view of the fuel tank fill pipe assembly taken along the line 2—2 of FIG. 1;

FIG. 3 is an enlarged fragmentary sectional elevational view of the fuel tank fill pipe assembly taken along the line 3—3 of FIG. 2;

FIG. 4 is a sectional elevational view of the fuel tank fill pipe assembly taken along the line 4—4 of FIG. 3;

FIG. 5 is a sectional elevational view of the fuel tank fill pipe assembly taken along the line 5—5 of FIG. 3;

FIG. 6 is a fragmentary sectional elevational view of a more or less conventional automatic shut-off, high velocity, fuel delivery nozzle inserted in the fill end of a fuel tank fill pipe assembly embodying this invention;

FIG. 7 is a sectional elevational view of a fuel tank fill pipe assembly embodying a modified form of this invention;

FIG. 8 is an end elevational view of the FIG. 7 fill pipe assembly taken looking in the direction of the arrows 8—8;

FIG. 9 is an end elevational view of the FIG. 7 fill pipe assembly taken looking in the direction of the arrows 9—9;

FIG. 10 is a fragmentary sectional elevational view taken looking in the direction of the arrows 10—10 of FIG. 7;

FIG. 11 is a sectional elevational view taken along the line 11—11 of FIG. 7; and FIG. 12 is another sectional elevational view taken along the line 12—12 of FIG. 7.

FIG. 1 shows a fuel or similar type of fluid container or tank 15 that has a fill pipe assembly 16 connected to the tank interior through an upper side wall portion 17. It will be noted that the location of the fill pipe discharge tube end 18a is spaced below the top wall 19 of the tank 15 so that a space is available within the tank 15 to accommodate thermal expansion of the tank contained fluid if the fluid supply to the tank through discharge tube 18 is automatically shut off when the fluid level reaches the location of the discharge tube end 18a.

Fill pipe assembly 16 that embodies this invention comprises an outer pipe 21 that has nestedly mounted therein the fluid discharge tube 18. The discharge tube 18 has its upper end 18b recessed within the upper end 21a of the outer pipe 21. The upper end 21a of pipe 21 has a cap receiving collar 23 fixedly connected thereto by soldering, brazing, or by a similar type of connection 25. Flange 23 is adapted to be screw connected to a support member 26 as shown at 27. The portion of the outer pipe 21 between the upper end of the tube 18b and the upper end of the pipe 21a is pierced by a vent pipe or outlet port 29. Port 29 permits the air within tank 15 to be vented during a fill operation and also avoids the development of a vacuum condition within the tank 15 when the fluid therein is being drained from the tank through a discharge port not shown.

The upper end 18b of the discharge tube 18 is flared as shown at 18c so that it will close off the annular space between the tube 18 and the pipe 21 at the upper end of tube 18. The reason for this flaring is to prevent spitback of liquid during a tank filling operation. It will be noted from the FIGS. 1–6 showing of the drawing that the discharge pipe 18 is eccentrically mounted within the outer pipe 21. While these pipes could be concentrically arranged, still, it is some advantage to use the eccentric arrangement because it provides the maximum area 31 (see FIGS. 4 and 5) between the upper side of discharge pipe 18 and the interior upper side of outer pipe 21. This area 31 receives the liquid carrying vapors that are forced back up through the area 31 by the kinetic energy of the fuel being discharged into tank 15 from pipe 18 during a tank filling operation. This annular fill vent area 31 that surrounds the fuel discharge tube 18 cooperates with porting 32, 33 and 34 in tube 18 and with the flared baffle portion 18c on the upper end of fill pipe 18 to produce a fluid flow pattern that will automatically shut off the delivery of fuel through the fill nozzle 40 before fluid backs up in the pipe 18 sufficiently to cause spit-back through the open cap receiving portion 23.

In FIG. 6 is shown a more or less conventional type of automatic shut off fuel tank fill nozzle 40. Nozzle 40 includes a spout or discharge pipe 41 that has a suction port 42 near its end that is connected to an internal tube 43. Tube 43 connects to a suction chamber 44 formed on the upper side of the flexible diaphragm 45. Chamber 54 on the lower side of diaphragm 45 is open to the atmosphere. Diaphragm 45 carries a latch pin 46 that is operable, when moved upwardly, to release the fill control lever 47 that is held in a fill position by the latch clip 48. The mechanism actuated by the latch pin 46 to release lever 47 has not been shown as it does not form a part of this invention and furthermore it is well known in the nozzle art relating to automatic fuel fill nozzles. Suction chamber 44 is connected through spout conduit tube 49 to the nozzle fuel flow chamber 50. The feathered arrows 51 show the delivery of fuel through chamber 50 to the spout 41 when the lever 47 has been set for fuel delivery. At this time there is atmospheric pressure on the underside of diaphragm 45 at approximately 15 p.s.i. As long as there is air surrounding the suction port 42 in the nozzle spout 41 the passage of fuel through the chamber 50 will develop a venturi suction that is transmitted through the conduit passage 49 to the upper diaphragm chamber 44 so that atmospheric pressure of approximately 15 p.s.i. is also present in the chamber 44 on the upper side of diaphragm 45. With equal pressures on opposite sides of the diaphragm 45 the latch pin 46 remains in its latching position and fuel flow control lever 47 is maintained in the position to deliver fuel through spout 41. When liquid fuel or fuel saturated vapor rises in the pipes 18 and 21 and surrounds the port 42, so that there is a change in the air pressure existing on the upstream side of the line 53, then the venturi suction effect of the fuel flow through chamber 50 will not maintain the necessary atmospheric pressure in upper diaphragm chamber 44 and the diaphragm 45 will move upwardly. The upward movement of the diaphragm 45 actuates the latch pin 46 so as to release the lever 47 and automatically shut off fluel flow through nozzle 40.

The particular nestedly arranged fill pipe assembly 16 shown in FIGS. 1–6 is designed to use the kinetic energy of fuel delivery to the tank 15 to force any liquid entrained in the air in the tank 15 to be vented through the annular vent area 31 between the nested tubes 18, 21. Furthermore, because the upper end of vent area 31 between pipes 18, 21 is closed by the flared baffle 18c, any air or vapor or liquid forced up through the area 31 will be passed radially inwardly through the slot-like ports 32, 33 and 34 into the upper end of pipe 18. The air passed through slots 32–34 will then pass upwardly and vent out through the vent pipe 29 in pipe 21 while the liquid that is entrained in the upwardly directed airstream will be deposited on the interior of the pipe 18 in the region of the slots 32–34. From FIG. 6 it will be noted that the slots 32–34 are positioned along the length of tube 18, adjacent the upper end thereof, such that any liquid discharged therethrough will be deposited around the suction port 42 of the nozzle spout 41. The deposition of liquid around the port 42 will prevent the flow of sufficient air through the port 42 to the chamber 44 to maintain the required atmospheric pressure in the chamber 44 or the upper side of diaphragm 45. As a result the diaphragm 45 will be moved upwardly by the atmospheric pressure in lower chamber 54 and the lever 47 that controls fuel flow through nozzle 40 will be moved to a position closing off fuel flow through the nozzle 40.

In the form of the invention shown in FIGS. 1–6, the vent port or slot 32 extending circumferentially around the upper side of tube 18 is wider than either one of the vent ports or slots 33 and 34 that extend circumferentially around the lower side of the tube 18 in the area of the nozzle port 42. As most of the air and liquid bearing vapor passing up through the vent area 31 will seek the upper side of the pipe 18 it is advantageous to have the larger vent slot 32 on the upper side of pipe 18 so as not to restrict venting of the tank 15. Any liquid forced up through the vent area 31 can flow up the lower interior side of pipe 21 and pass through the lower slots 33, 34 so as to surround the area in tube 18 adjacent the nozzle suction port 42. It will be noted that the pair of slots 33, 34 are spaced axially along the tube 18 so that there is an adequately large area within which the nozzle spout suction port 42 may be positioned so as to be subjected to the effects of the venting spray that automatically operates the diaphragm shut off control for lever 47.

It is thought to be obvious from the preceding description that the kinetic energy fuel flow that forces air and vapors up through the vent area will cause deposition of sufficient liquid around the nozzle suction port 42 to cause a shut off of the fuel flow through the nozzle before the liquid in the tank 15 has risen to such a level that it will spit back through the fill tube 18 and be sprayed out the open upper end fitting 23 of the pipe 21. The nested arrangement of the fill pipe 18 and the outer pipe 21 to provide the vent area 31 therebetween is an important part of this invention. Also the vent area 31 having vent ports 32–34 arranged to direct vented liquid and vapor around the nozzle suction port 42 is another essential feature of this invention.

FIGS. 7–12 show a modified form of this invention wherein a different type of nested pipe and tube arrangement is used from that shown in FIGS. 1–6, but wherein the basic principle of operation is the same as in the FIGS. 1–6 form of this invention. In the FIGS. 7–12 form the outer pipe 21 provides the fluid discharge pipe through which the nozzle spout 41 discharges its fuel supply. The nestedly arranged inner pipe 80 is used only to provide a vent conduit in the FIGS. 7–12 form of the invention. It will be noted that the vent pipe 80, that provides the vent area in this form of the invention, is of circular cross section throughout the majority of its length, but at its upper end portion 80a it is flattened out to provide an arcuate tube portion that is interiorly of and nested against the upper side of the outer pipe 21 (See FIG. 11). The extreme upper end portion 80b of vent pipe 80 is flattened against itself to close off the passageway through the upper end of tube 80. The flattened portion 80b acts as a baffle or stop to the airstream, vapor or entrained liquid forced upwardly through vent pipe 80 by the kinetic energy of the fuel being fed into the associated tank 15 through nozzle 40. The arcuate tube portion 80a at the upper end portion of vent tube 80 overlies the nozzle spout 41 and it is pierced by a plurality of vent ports 81. It is thought to be clear that the vent ports 81 are so arranged with respect to the nozzle spout suction port 42 that vapor and/or liquid entrapped in the fluid flow through the vent tube 80 will be deposited adjacent the suction port 42 during a venting operation. As a result of such deposition the nozzle diaphragm 45 will automatically shut off fuel flow through the nozzle 40 before fuel has risen in the fill pipe 21 sufficiently to cause a spit-back through the open upper end fitting 23 of pipe 21. Vent port 29 in the upper end of outer pipe 21 functions in its normal manner as explained with regard to the FIGS. 1–6 form of this invention. It will also be noted that vent tube 80 is positioned adjacent the upper side of the fill pipe 21 so that the fuel may flow along the lower side of pipe 21 and force the venting fluid to pass above the liquid fuel flow. This arrangement whereby the vent area is above the fuel filling conduit is most advantageous in an arrangement of this type even though the benefits of this invention may be achieved by other positions of the vent pipe or vent area within the fill pipe.

I claim:

1. An anti-spit-back fill pipe assembly for a closed fluid container having a fill end with an oppositely located discharge end of the fill pipe assembly connected to the container at a shallow angle to the horizontal, comprising an outer pipe, an inner pipe of smaller diameter nestedly and fixedly arranged within and extending substantially the full length of the outer pipe, said pipes providing separate fluid fill and vent conduits extending lengthwise of the pipe assembly to the discharge end thereof, said inner pipe having vent porting extending therethrough adjacent the fill end of the pipe assembly that connects to the fluid fill conduit at the location where a fill nozzle would be positioned, and baffle means closing off the vent conduit between the fill end of the pipe assembly and the porting to direct the vent flow in the vent conduit through the vent porting and into the fluid fill conduit at the fill end thereof.

2. An anti-spit-back fill pipe assembly for a closed fluid container having a fill end with an oppositely located discharge end of the fill pipe assembly connected to the container at a shallow angle to the horizontal, comprising an outer pipe, an inner pipe of smaller diameter nestedly and fixedly arranged within and extending substantially the full length of the outer pipe, said pipes providing separate fluid fill and vent conduits extending lengthwise of the pipe assembly to the discharge end thereof, said inner pipe having vent porting extending therethrough adjacent the fill end of the pipe assembly that connects to the fluid fill conduit at the location where a fill nozzle would be positioned, baffle means closing off the vent conduit between the fill end of the pipe assembly and the porting to direct the vent flow in the vent conduit through the vent porting and into the fluid fill conduit at the fill end thereof, and a vent outlet in said outer pipe between the fill end thereof and said baffle means that is connected to the fluid fill conduit to provide an outlet for the vent flow directed into the fluid fill conduit through said vent porting.

3. An anti-spit-back fill pipe assembly for a closed fluid container having a fill end with an oppositely located discharge end of the fill pipe assembly connected to the container at a shallow angle to the horizontal, comprising an outer pipe of substantially constant diameter, an inner pipe of smaller diameter nestedly and fixedly arranged within and extending the full length of the outer pipe, said pipes providing separate fluid fill and vent conduits extending lengthwise of the pipe assembly to the discharge end thereof, said inner pipe having vent porting extending therethrough adjacent the fill end of the pipe assembly that connects to the fluid fill conduit at the location where a fill nozzle would be positioned, baffle means at least partially closing off the vent conduit between the fill end of the pipe assembly and the porting to direct the vent flow in the vent conduit through the vent porting and into the fluid fill conduit at the fill end thereof, and a vent outlet in said pipe assembly at the fill end thereof connected to the fluid fill conduit to provide an outlet for the vent flow directed into the fluid fill conduit through said vent porting.

4. In an anti-spit-back fill pipe assembly as set forth in claim 1 wherein the vent porting in said inner pipe comprising a plurality of apertures spaced longitudinally of the inner pipe.

5. In an anti-spit-back fill pipe assembly as set forth in claim 3 wherein said inner pipe is eccentrically mounted within the lower portion of said outer pipe so that the major portion of the vent conduit is between the upper side of the inner and outer pipes.

6. In an anti-spit-back fill pipe assembly as set forth in claim 3 wherein said baffle means is provided by a deformation of the fill end of said inner pipe.

References Cited in the file of this patent
UNITED STATES PATENTS

| | | |
|---|---|---|
| 477,011 | Kirchner | June 14, 1892 |
| 1,938,138 | Downs | Dec. 5, 1933 |
| 2,508,124 | Stephenson | May 16, 1950 |
| 2,548,734 | Mathey | Apr. 10, 1951 |
| 2,850,050 | Connolly | Sept. 2, 1958 |